United States Patent [19]

Auer

[11] Patent Number: 4,492,131

[45] Date of Patent: Jan. 8, 1985

[54] FLYWHEEL

[75] Inventor: Werner Auer, Wiesenbach, Fed. Rep. of Germany

[73] Assignee: Teldix GmbH, Heidelberg, Fed. Rep. of Germany

[21] Appl. No.: 597,216

[22] Filed: Apr. 6, 1984

Related U.S. Application Data

[63] Continuation of Ser. No. 365,474, Apr. 5, 1982, abandoned.

[30] Foreign Application Priority Data

Apr. 11, 1981 [DE] Fed. Rep. of Germany ....... 3114798

[51] Int. Cl.³ .............................................. F16F 15/10
[52] U.S. Cl. .................................. 74/574; 29/159 R; 29/159.01
[58] Field of Search ............... 74/572, 574; 29/159 R, 29/159.01, 159.02, 159.03

[56] References Cited

U.S. PATENT DOCUMENTS

| | | | |
|---|---|---|---|
| 1,318,302 | 10/1919 | Sperry | 74/572 |
| 1,939,173 | 12/1933 | Junkers | 74/574 |
| 2,062,369 | 12/1936 | Meyer | 74/574 |
| 2,477,081 | 7/1949 | Pierce | 74/574 |
| 2,714,823 | 8/1955 | Dall et al. | 74/574 |
| 2,722,138 | 11/1955 | Neher | 74/574 |
| 3,986,411 | 10/1976 | Kirby | 74/574 |
| 4,083,265 | 4/1978 | Bremer, Jr. | 74/574 |

FOREIGN PATENT DOCUMENTS 2225925 1/1974 Fed. Rep. of Germany.

*Primary Examiner*—James A. Leppink
*Assistant Examiner*—Frank H. McKenzie, Jr.
*Attorney, Agent, or Firm*—Spencer & Frank

[57] ABSTRACT

A flywheel including a bearing unit, a flywheel mass provided with at least two partial masses, and separate connecting means each connecting the bearing unit with a respective one of the at least two partial masses. Each respective partial mass and separate connecting means comprise a partial system. The partial systems are constructed such that each exhibits resonance step-up at a different frequency when subjected to an external excitation to thereby reduce the stress on the bearing unit as a result of resonance step-up at a respective one of the different resonant step-up frequencies.

14 Claims, 3 Drawing Figures

FLYWHEEL

BACKGROUND OF THE INVENTION

This application is a continuation of application Ser. No. 365,474 filed Apr. 5, 1982 now abandoned.

The present invention relates to a flywheel comprising a bearing unit, a flywheel mass, and connecting means, such as spokes, connecting the bearing unit with the flywheel mass. The present invention is particularly concerned with means for reducing stress on the bearing unit as a result of resonance step-up occurring at the resonant frequency. The principles of the invention are equally applicable to a reaction wheel.

Flywheels, particularly those used in spacecraft, are designed to reach a given spin after a given number of revolutions, while meeting important design requirements, such as low weight and high reliability. In a rotating body the moment of inertia, and thus the spin, depends on the square of the distance of the rotating mass from the center of the body. In order to maximize the moment of inertia of the flywheel, the flywheel mass is therefore provided at the outer radius of the rotor. This flywheel mass is connected with the bearing by means of connecting elements, for example spokes. The flywheel mass and the connecting elements, however, inevitably have slight elastic deformability which can subject the flywheel to vibration. Such vibrations are of particular concern during the launch of a spacecraft when external excitations at the resonant frequency of the flywheel system may produce very high stress peaks which may lead to damage of the bearing or even to complete uselessness of the entire flywheel. German Offenlegungsschrift (Laid Open Patent Application) No. 2,225,925, published Jan. 17, 1979, discloses a flywheel in which such bearing stresses are reduced by damping devices which are provided in or at the connecting elements.

SUMMARY OF THE INVENTION

An object of the present invention is to provide a further or additional measure by which high bearing stresses in a flywheel resulting from resonance step-up can be reduced.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

In accordance with the foregoing objects and in accordance with its purpose, the present invention provides a flywheel including a bearing unit, a flywheel mass provided with at least two partial masses, and separate (i.e. independent) connecting means each connecting the bearing unit with a respective one of the at least two partial masses wherein each respective partial mass and separate connecting means comprises a partial system. The partial systems are constructed such that each exhibits a resonance step-up at a different frequency when subjected to an external excitation to thereby reduce the stress on the bearing unit as a result of resonance step-up at one of the resonant frequencies.

Thus, in accordance with the present invention, external excitation, due to, for example, vibrations experienced during spacecraft launch, cause resonance step-up to only part of the flywheel system, including part of the flywheel mass and associated connecting means. Bearing stresses are correspondingly reduced and smaller bearings therefore can be used which have a correspondingly reduced friction.

The characteristic that if one part of the flywheel system exhibits resonance step-up, the other part either continues to be at rest in the supercritical case or practically resonates only at the amplitude of the exciting vibration in the subcritical case, is utilized to produce a damping effect on the part of the system which vibrates considerably. This is accomplished in one aspect of the invention by providing a friction coating between partial flywheel systems.

As an alternative embodiment of the invention, adjacent partial flywheel systems are arranged in such a way that they normally do not contact one another, but that when the system is in resonance they will periodically hit each other, thus limiting the resonance amplitude. In this embodiment, the contacting faces of the connecting means and/or of the partial masses must be designed to resist impact.

It is to be understood that both the foregoing general description and the following detailed description are exemplary, but are not restrictive of the invention.

DETAILED DESCRIPTION OF THE PREFERRED EMBODIMENTS

Figure 1:
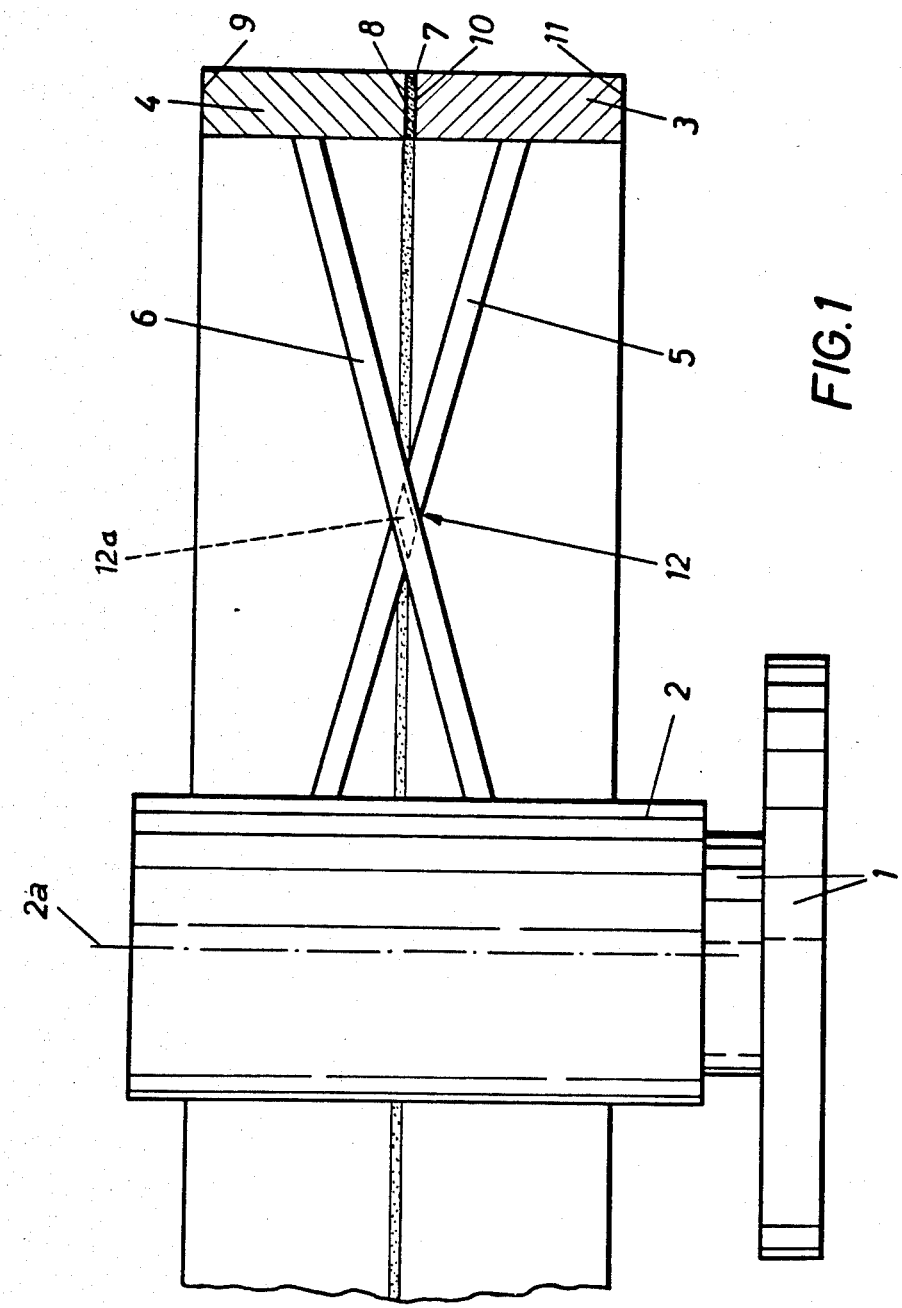
FIG. 1 is a schematic sectional view of one embodiment of a flywheel according to the present invention.

In FIG. 1, a stator 1 of a flywheel has a wheel hub 2 mounted thereon. Hub 2 has an axis of rotation 2a. Two juxtaposed annular partial flywheel masses 3 and 4 with respective radial end surfaces 8, 9, 10 and 11 are connected with hub 2 by means of respective spokes 5 and 6, forming respective spoke-mass partial systems 3, 5, and 4, 6. Spokes 5 and 6 are structurally independent of each other and are thus flexible or yieldable in the axial direction. Only one spoke 5 or 6, respectively, is shown for each partial system. Spokes 5 and 6 may be given an attenuating design as disclosed in German Offenlegungsschrift No. 2,225,925, or may be connected via damping means with partial masses 3 and 4.

Partial masses 3 and 4 are axially aligned and at the same distance from axis of rotation 2a. One of partial masses 3 or 4 is provided with a friction coating 7 on an adjacent end face 8 or 10 against which rests the other partial mass. The material of which said frictional coating is made may be glass-fiber-reinforced plastic.

If vibrations occur in the radial direction, these vibrations are damped by the occurring friction. Deflections in the axial direction are also limited and damped.

By differently designing the spokes 5, 6 and/or the partial masses 3, 4, partial systems can be formed which have different resonant frequencies. For example, partial masses 3 and 4 may be constructed to have different weights and/or dimensions, and/or spokes 5 and 6 may be configured differently.

Figure 2:
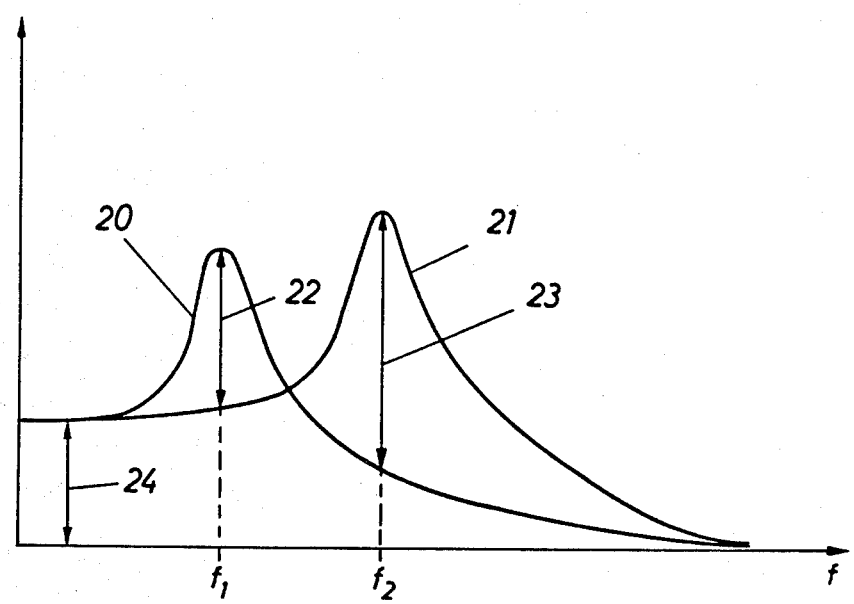
FIG. 2 is a diagram showing the behavior of the partial system of the embodiment of FIG. 1 when the frequency of the vibrations changes.

The general behavior of the partial systems under varying frequencies of the external excitation (vibration) is shown in FIG. 2. The amplitude of the vibrations of the partial systems and of the excitation, respectively, is plotted over the frequency f. The curve of one partial system is marked with numeral 20; the curve of the other partial system is marked with numeral 21. Below their resonant frequency, the two partial systems vibrate in correspondence with the excitation amplitude 24 (subcritical range). In the vicinity of their resonant frequencies $f_1$ and $f_2$, the amplitude of the vibrations increases considerably and thereafter asymptotically approaches 0 amplitude (super-critical range). The resonant frequencies of the systems are separated so that at frequencies $f_1$ or $f_2$, respectively, only one partial system at a time places a significant stress on the bearing. The differences in amplitude 22 or 23, respectively, between curves 20 and 21 for these two partial systems at resonant frequencies $f_1$ and $f_2$ are an indication of the separate stress exerted by the partial systems, which can be utilized for damping since considerable relative movement results between the partial systems.

As an alternative instead of the frictional coating 7 or in addition thereto there may be provided a frictional coating 12a between adjacent spokes 5 and 6 at their point of intersection 12.

Figure 3:
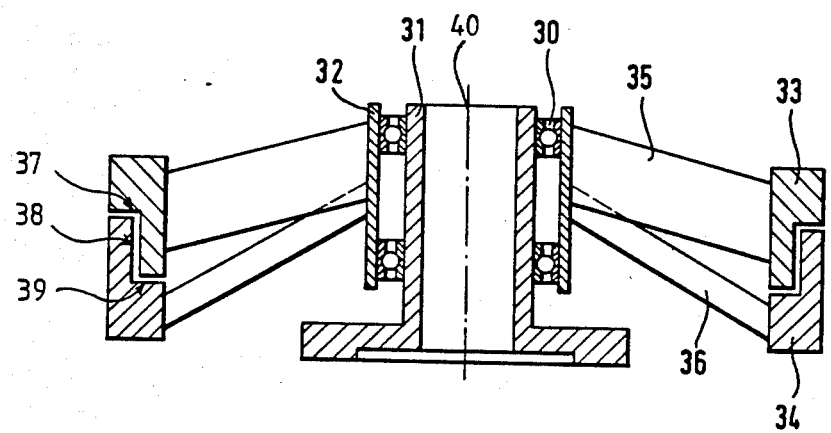
FIG. 3 is a schematic sectional view of another embodiment of a flywheel according to the present invention.

FIG. 3 shows a sectional view of an alternative embodiment of the present invention. A stator 31 is provided about which a wheel hub 32 rotates via two ball bearings 30. Spokes 35 and 36, which here have a different configuration, connect two annular masses 33 and 34 to hub 32. Masses 33 and 34 are shaped such that together they include orthogonal sets of spaced opposing parallel surfaces 37, 38, 39. Set 38 is shown as parallel to an axis of rotation 40. Partial systems 33, 35 and 34, 36 again have different resonant frequencies and normally are not in contact. However, in response to axial and/or radial vibrations, the partial system in resonance will periodically hit the other partial system, thus limiting the resonant amplitude. The contacting faces of the partial masses and/or the connecting means must be designed to resist impact.

As a further alternative, masses 33 and 34 may be designed in such a manner that they contact one another in the absence of excitation in which event they will rub against each other to damp external vibration. Masses 33 and 34 may even be provided with a special friction coating on one surface of each set of orthogonal surfaces 37, 38 and 39 for both directions of movement, which results in velocity dependent damping.

It will be understood that the above description of the present invention is susceptible to various modifications, changes and adaptations, and the same are intended to be comprehended within the meaning and range of equivalents of the appended claims.

What is claimed is:

1. A flywheel comprising: a hub for a bearing unit; a flywheel mass including at least two partial masses; and independent connecting means each connecting said hub with a respective one of said at least two partial masses, each respective partial mass and independent connecting means representing a partial system, wherein said partial systems are constructed such that each exhibits a resonance step-up at a different resonant frequency when subjected to an external excitation to damp at least one of axial and radial vibrations of said flywheel that are caused by the external excitation, thereby reducing the stress on said hub as a result of resonance step-up at a respective one of said different resonant frequencies.

2. A flywheel as defined in claim 1 further comprising a damping member disposed between said partial systems.

3. A flywheel as defined in claim 2 wherein said damping member comprises a friction coating on at least one of said partial masses.

4. A flywheel as defined in claim 3 wherein said at least two partial masses comprise first and second annular shaped members with opposite radial end surfaces, and each is disposed at the same distance from said hub; said first and second partial masses are axially aligned with one said radial end surface of said first partial mass adjacent to one said radial end surface of said second partial mass, and said friction coating is disposed on at least one of said adjacent end surfaces and touches the other of said adjacent end surfaces.

5. A flywheel as defined in claim 1 wherein said partial systems are arranged to define a space therebetween in the absence of vibrations, the space having a dimension such that if there is resonance step-up at one said partial system said partial system will come into periodic contact with one another, and said partial systems are provided with contacting faces that are impact resistant.

6. A flywheel as defined in claim 1 further comprising a damping member disposed between said independent connecting means.

7. A flywheel as defined in claim 6 wherein said damping member is a friction layer disposed between said independent connecting means.

8. A flywheel as defined in claim 1 wherein said connecting means are provided with attenuating means.

9. A flywheel as defined in claim 8 wherein said attenuating means includes a friction generating part.

10. A flywheel as defined in claim 1 wherein said independent connecting means comprise independent spokes of different configurations.

11. A flywheel as defined in claim 1 wherein said flywheel has an axis of rotation and said at least two partial masses comprise first and second annular members disposed in axial alignment, each having at least one first linear surface parallel to said axis of rotation and at least one second linear surface normal thereto, said at least one first linear surface of said first annular member being juxtaposed and parallel with said at least one first linear surface of said second annular member, and said at least one second linear surface of said first annular member being juxtaposed and parallel with said at least one second linear surface of said second annular member.

12. A flywheel as defined in claim 11 wherein said juxtaposed and parallel surfaces are spaced apart.

13. A damping arrangement comprising: a hub having an exterior surface and an axial dimension; and at least two partial systems each including an annular shaped partial mass and an independent radially extending connecting means for connecting said partial mass to the exterior surface of said hub, each said partial system being constructed for having a resonance step-up at a respectively different resonant frequency for damping vibrations in at least one of a direction parallel to the axial dimension of said hub and a direction normal to the axial dimension of said hub when said arrangement is subjected to an external excitation which results in such vibrations at one of the different resonant frequencies.

14. A damping arrangement as defined in claim 13, wherein said at least two partial systems are so spaced apart that they engage one another during resonance step-up at a respective one of the different resonant frequencies.

* * * * *